United States Patent [19]
Mir et al.

[11] 4,375,649
[45] Mar. 1, 1983

[54] SCANNING DEVICE WITH AREA-TO-LINEAR MAPPING AND RELATED ELECTRONIC SCANNER/PRINTER APPARATUS

[75] Inventors: José M. Mir, Rochester; Jerry R. Varner, Fairport; Clark N. Kurtz, Rochester, all of N.Y.

[73] Assignee: Eastman Kodak Company, Rochester, N.Y.

[21] Appl. No.: 268,974

[22] Filed: Jun. 1, 1981

[51] Int. Cl.³ .............................................. H04N 1/22
[52] U.S. Cl. ........................................ 358/75; 355/32
[58] Field of Search ................... 358/2, 75, 78, 60, 61, 358/213, 285, 286, 296, 300, 302; 355/4, 5, 18, 32, 37, 38, 67, 70, 71; 350/3.6, 3.7, 3.71, 3.72, 3.73, 370, 374, 378, 380, 400, 403; 353/20; 250/229

[56] References Cited

U.S. PATENT DOCUMENTS

| | | | |
|---|---|---|---|
| 3,529,887 | 9/1970 | Lu | 350/3.73 |
| 3,862,428 | 1/1975 | Waters | 350/3.73 |
| 4,052,706 | 10/1977 | Spitz | 350/3.6 |
| 4,129,357 | 12/1978 | Title | 350/403 |
| 4,229,095 | 10/1980 | Mir | 358/75 |
| 4,316,196 | 2/1982 | Jacobs | 350/356 |

*Primary Examiner*—Michael A. Masinick
*Attorney, Agent, or Firm*—John D. Husser

[57] ABSTRACT

A two-dimensional illuminating array comprising discretely addressable pixel portions (e.g. a light valve array) is imaged by lens means onto optical mapping means (e.g. a light diffracting or refracting array). The mapping means re-images the pixel portions of the illuminating array as a predetermined line pixel pattern at a linear pixel region.

17 Claims, 4 Drawing Figures

SCANNING DEVICE WITH AREA-TO-LINEAR MAPPING AND RELATED ELECTRONIC SCANNER/PRINTER APPARATUS

CROSS-REFERENCE TO RELATED APPLICATIONS

Reference is hereby made to U.S. patent application Ser. No. 230,099, entitled "Light Valve Imaging Apparatus Having Improved Addressing Electrode Structure" and filed Jan. 29, 1981, in the names of J. M. Mir and J. R. Varner and U.S. patent application Ser. No. 230,095, entitled "Light Valve Imaging with Optimized Addressing Potentials to Reduce Inter-Pixel Nonuniformity" and filed Jan. 29, 1981, in the name of J. M. Mir.

BACKGROUND OF THE INVENTION

1. Field of the Invention

The present invention relates to devices of the kind adapted to scan light on a pixel (picture element) by pixel basis in response to electronic address signals. More specifically, the present invention relates to improved light control devices and to electronic scanning and/or printing apparatus using such improved devices.

2. Description of the Prior Art

Recently, it has been found that light valve array devices provide a highly useful vehicle in electronic imaging. One preferred light valve configuration comprises a piece of ferro-electric ceramic material, such as lanthanum-doped lead zirconate titanate (PLZT), which is sandwiched between crossed polarizers and electrically activatible to operate in a Kerr cell mode. An array of such light valves comprises such crossed polarizers and a panel of PLZT material that has a plurality of electrodes formed on one of its major surfaces. The electrodes are arranged in a manner facilitating the selective application of discrete electrical fields across (in a direction perpendicular to the direction of viewing) discrete surface areas which constitute pixel portions of the panel. Upon application of such fields, the PLZT material becomes birefringent and rotates the direction of polarization of incident light by an extent dependent on the field magnitude. This results in transmission of light through the PLZT pixels and cooperating polarizers varying as a function of the respective addressing fields.

U.S. Pat. No. 4,229,095 discloses various embodiments of electronic color-imaging apparatus that utilize such light valve arrays to effect multicolor exposure of panchromatic recording media. For example, a color image is formed electronically by selectively opening and closing individual light valves of such arrays in synchronization with the energization of red, green and blue exposing sources and according to the red, green and blue color information for the pixels of that image. One preferred embodiment disclosed in that patent comprises a linear light valve array disposed in spaced transverse relation to the recording media feed path. The pixels of the array are addressed concurrently with image information, a line at a time, and the movement of the recording medium, and the red, green and blue color exposures are synchronized with successive actuations of the linear array.

It can be appreciated that light valves must address many image pixels per line in order to form images having even moderate detail. The number of pixels per line increases in accordance with the resolution requirements of the imaging application, e.g. becoming as large as 200 pixels per inch or larger for high quality continuous tone imaging. Each pixel of the recording medium must be independently addressable with light in accordance with the unique content of the image to be reproduced. Therefore, discretely-activatible electrode means has been provided for each pixel portion of the light valve array, and each electrode means has had its own high voltage "off-on" switch, e.g. a transistor amplifier. The cost and complexity of these many switches and their connection and packaging present problems in electronic imaging with light valve devices.

Another problem encountered in fabricating light valve array devices relates to the electro-optic modulator panel, which is commonly formed as a linear strip having a length dimension sufficient to transverse an image exposure or scan zone. Although such linear modulator strips theoretically can be quite small in area (viz, the exposure zone length × one pixel in width), practical fabrication, handling and electronic packaging considerations militate toward a greater width. For example, while the width of the strip could be on the order of 0.1 mm from an optical viewpoint, difficulties are presented in fabricating and handling modulator strips less than 10 mm in width. Thus, there is a "waste" of modulator material, which is expensive.

Still another problem exists with respect to such linear light valve array configurations. Specifically, the magnitude of their length usually necessitates special illuminating and imaging optics, which further adds to the cost of using such devices.

SUMMARY OF THE INVENTION

It is a significant purpose of the present invention to avoid the above-described problems connected with light valve devices employing linear light valve arrays. Accordingly, the present invention provides an improved approach, utilizing optical mapping means and an area light valve array, to supplant such linear light valve arrays for linear imaging.

One important advantage of the present invention is to reduce requisite sizes for the ceramic electro-optic panels of light valve arrays. Another important advantage is to simplify optical elements used in and with such devices. Still another advantage is to facilitate the electronic address of such devices, e.g. by allowing less complex electrode, switching and connecting structure. Thus one general objective of the present invention is to provide more simple devices for linear imaging, thus reducing the cost and enhancing the reliability of such devices.

In one general aspect, the present invention can be characterized as a light valve device, adapted to control light passage selectively to discrete pixel zones along a linear region, and comprising: (i) an area light valve array having a plurality of discretely-addressable pixel portions distributed in a two-dimensional pattern; (ii) lens means for imaging those pixel portions, in such pattern, at an intermediate image plane and (iii) optical mapping means, located at the intermediate image plane, for re-imaging the pixel portions of such pattern as a predetermined, one-dimensional line pattern coinciding with pixel zones of such linear region.

In certain preferred embodiments said optical mapping means respectively comprises an array of light-diffracting elements or an array of light-refractive elements. In other preferred embodiments said area array comprises two multistrip electro-optic modulator panels disposed orthogonally and sandwiched between light polarizing means. In other preferred embodiments such area array comprises a two-dimensional electro-optic panel and an electrically coupled thin film transistor array, sandwiched between crossed polarizers.

In another aspect the invention is characterized as an electronic imaging apparatus which incorporates such area-to-linear light valve devices in combination with predetermined addressing and synchronizing which enable exposure of successive lines of a recording medium moved past a linear exposure station.

In yet another aspect the present invention provides optical mapping configuration which are useful with other area arrays of discretely addressable illuminating elements, e.g. area LED arrays.

BRIEF DESCRIPTION OF THE DRAWINGS

The subsequent description of preferred embodiments of the invention refers to the attached drawings wherein.

DETAILED DESCRIPTION OF THE PREFERRED EMBODIMENTS

Figure 1:
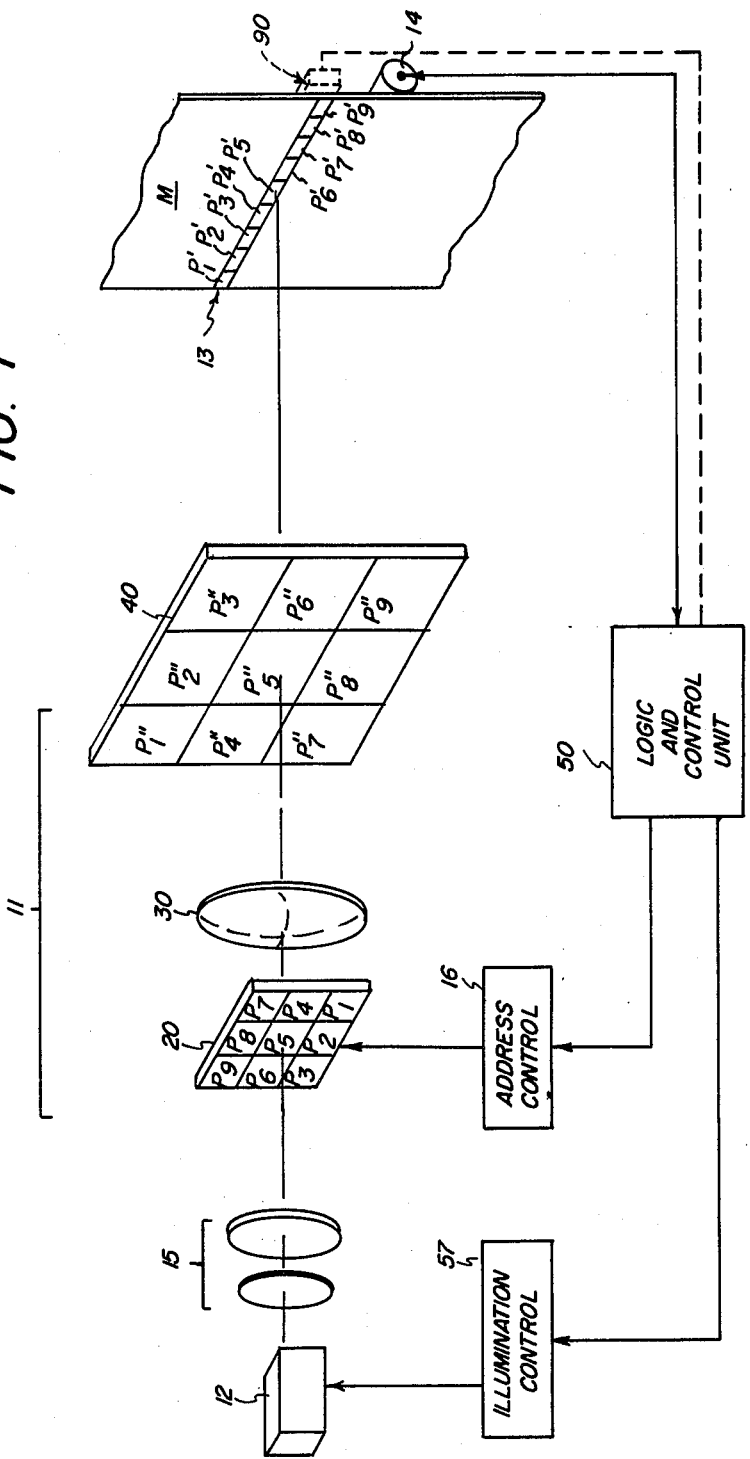
FIG. 1 is a schematic perspective of one preferred embodiment of electronic printer or electronic scanner/printer apparatus having an area-to-linear light valve device in accordance with the present invention.

In general the electronic printer embodiment shown in FIG. 1 includes an area-to-linear light valve device 11 and an illumination source 12 adapted to direct light toward linear exposure station 13 via that light valve device. The general intended function of the printer embodiment is to expose successive lines of pixels (e.g. $P'_1$–$P'_9$) of recording medium M, in accordance with image information corresponding to an original to be reproduced, as the recording medium is moved past the linear exposure station by suitable device means 14. For this purpose the light valve device 11 is uniformly illuminated by appropriate beam expanding optical elements 15 and addressed by address control 16 to control the passage of that light in accordance with image information.

More particularly, in accord with the present invention, area-to-linear light valve device 11 comprises an area light valve array 20, lens means 30 and optical mapping means 40. Area light valve array 20 includes a plurality of discretely-addressable pixel portions $P_1$–$P_9$ distributed in a two-dimensional pattern and lens means 30 is constructed to image the pixel portions $P_1$–$P_9$ in that two-dimensional pattern at an intermediate image plane. Optical mapping means 40 is located in the intermediate image plane and includes a plurality of discrete optical elements $P''_1$–$P''_9$ located respectively to receive the light images of light valve array pixel portions $P_1$–$P_9$. Elements $P''_1$–$P''_9$ of the optical mapping means 40 are, in turn, adapted to re-image the light from array 20 respectively at pixels $P'_1$–$P'_9$ of exposure station 13.

As shown in FIG. 1, pixels $P'_1$–$P'_9$ form a one-dimensional linear pattern extending across the exposure station 13.

Optical mapping means 40 can take various forms. In one preferred embodiment, wherein light source 12 provides coherent light, e.g. from a laser(s), the elements $P''_1$–$P''_9$ of mapping means 40 comprise holograms adapted to diffract light from the respective light valve pixel portions $P_1$–$P_9$ to the corresponding pixels $P'_1$–$P'_9$ of the linear exposure station.

Figure 3:
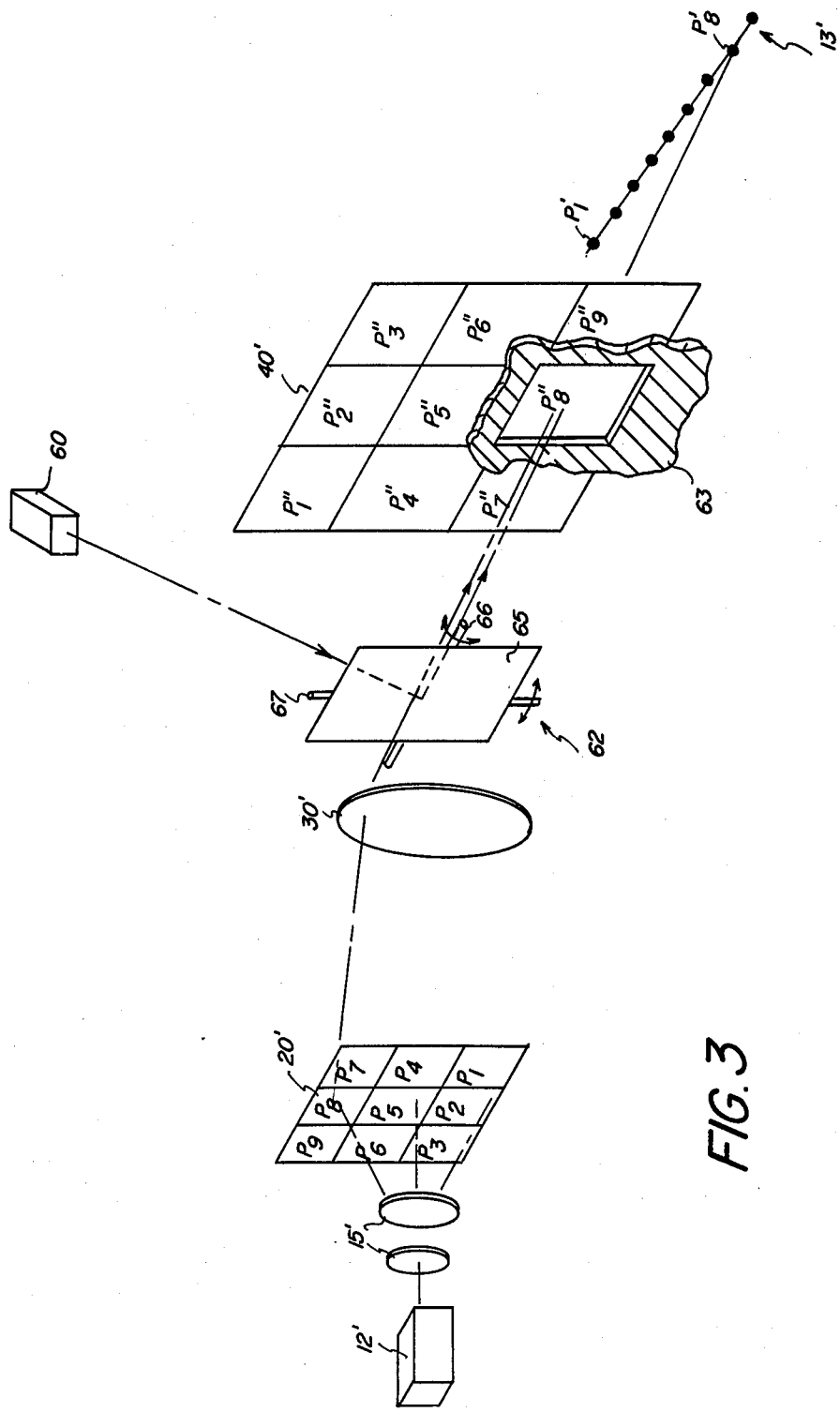
FIG. 3 is a schematic perspective view illustrating one preferred optical configuration for forming a holographic optical mapping array in accordance with the present invention.

There are various operable procedures for constructing such a holographic mapping array. One procedure, illustrated in FIG. 3 is to image a coherently-illuminated, identical light valve array 20' at the desired optical mapping plane with a holographic recording medium 40', e.g. fine-grained photographic emulsions, located at the optical mapping plane. The pixel portions of light valve array 20' are sequentially activated (e.g. $P_8$ is shown activated) to transmit light from source 12', via lens 30', to their respective portions of the mapping plane (in this instance $P_8''$). Concurrently reference beam light 60 from laser 61 is directed by reflective means 62 to a location of linear zone 13' (here $P_8'$) where it is desired that the illuminated light valve portion ($P_8$) be "optically mapped." Masking means 63 is provided to block light from portions of the holographic record medium 40' other than is being exposed.

In the FIG. 3 arrangement reflective means 62 in a beam splitter mirror 65 adapted to allow light from array 20' to pass and reflecting light from source 60. The mirror 65 is mounted for rotation on axes 66 and 67 to facilitate directing light to each of the spots $P_1'$–$P_9'$. Mask 63 is moved in synchronism with the mirror to index the respective portions ($P_1''$–$P_9''$) of the mapping array. Thus, the convergent beams from array 20' and mirror 65 interfere in the recording medium 40' to form latent holograms of mapping array.

Once the hologram mapping array has been completely exposed, it is processed and placed in the FIG. 1 apparatus in substantially the same optical relation with the FIG. 1 counterparts array 20, lens 30 and linear zone 13. When any member of the light array is activated, its image at the mapping array is converted to a focused wavefront directed to the corresponding spot in the linear zone 13.

It should be noted that many methods are known for making copies of holograms, so that this procedure need be done only once in a manufacturing operation. Depending on the type of hologram, diffraction efficiencies can achieve values approaching 100%.

In another preferred embodiment, optical mapping means 40 comprises an array of discrete Fresnel lens elements $P''_1$–$P''_9$ adapted, respectively, to refract light from light valve array pixel portions $P_1$–$P_9$ to corresponding pixels $P'_1$–$P'_9$ of the exposure station 13. Such an array of light-refractive elements can be constructed in various ways well known in the optical industry. For example, the necessary grooves can be cut into a machinable master material and then copies mass produced by embossing into a transparent refractive optical material. See for example the teachings disclosed in U.S. Pat. Nos. 3,754,811; 3,754,813; 3,765,281 and 3,788,171. For the case illustrated in FIG. 1, the necessary groove pattern can be calculated on a computer since each element of the mapping array is an off-axis square section of a simple Fresnel lens. For example, to map the light incident on $P_1''$ area to $P_1'$ spot, a section of a Fresnel lens is provided in the mapping array plane with its optical axis intersecting point $P_1'$. It is to be noted that for this embodiment light incident on array 40 should be substantially collimated and parallel to the optical axis of the system (i.e. substantially normal to the array 40). This can be accomplished, e.g., by forming lens 30 as a telecentric-telecentric telescope type lens. Light incident on the array 20 also should be substantially collimated.

In accordance with the present invention, two-dimensional light valve array 20 also can have various forms. In one preferred embodiment shown in FIG. 2, the array 20 comprises first and second area modulators 21 and 22 and entrance, intermediate and exit light polarizing means 23, 24 and 25. It will be appreciated that dimension and configuration of the area modulators and polarizing means will vary depending upon the application in which the array is to be used. Generally, the elements will be approximately uniform in their major dimension, the polarizing means 23-25 being schematically illustrated as circular in the drawing only to pictorially emphasize their function. The arrays and polarizing means are illustrated along a straight line optical axis; however, it will become clear that various mirrors, prisms, etc. could be arranged to define a different optical axis between these elements. Although not in a straight line relation such as shown in FIG. 2, those elements would be optically aligned.

The area modulators 21 and 22 are formed of electro-optical material of the type which transforms from a non-polar, optically-isotropic state to a polar, strongly-birefringent state when an electrical field is applied thereacross. PLZT ferroelectric ceramic of a kind known in the art (see, e.g., U.S. Pat. Nos. 3,612,656; 3,998,523 and 4,053,207) is a preferred class of material; however, there are various other well known materials which exhibit the desired electro-optic behavior described above. A particularly preferred material is 9/65/35 PLZT. The area modulators can be formed as a unitary panel or as a plurality of separate panels, e.g., strips supported together to define a two-dimensional imaging area.

The polarizing means preferably are selected from various known materials such as sheet polarizer materials which exhibit dichroism e.g. Polaroid sheet polarizers. In certain applications other light polarizing techniques such as Nichol prisms and Brewster mirrors may be used.

Figure 2:
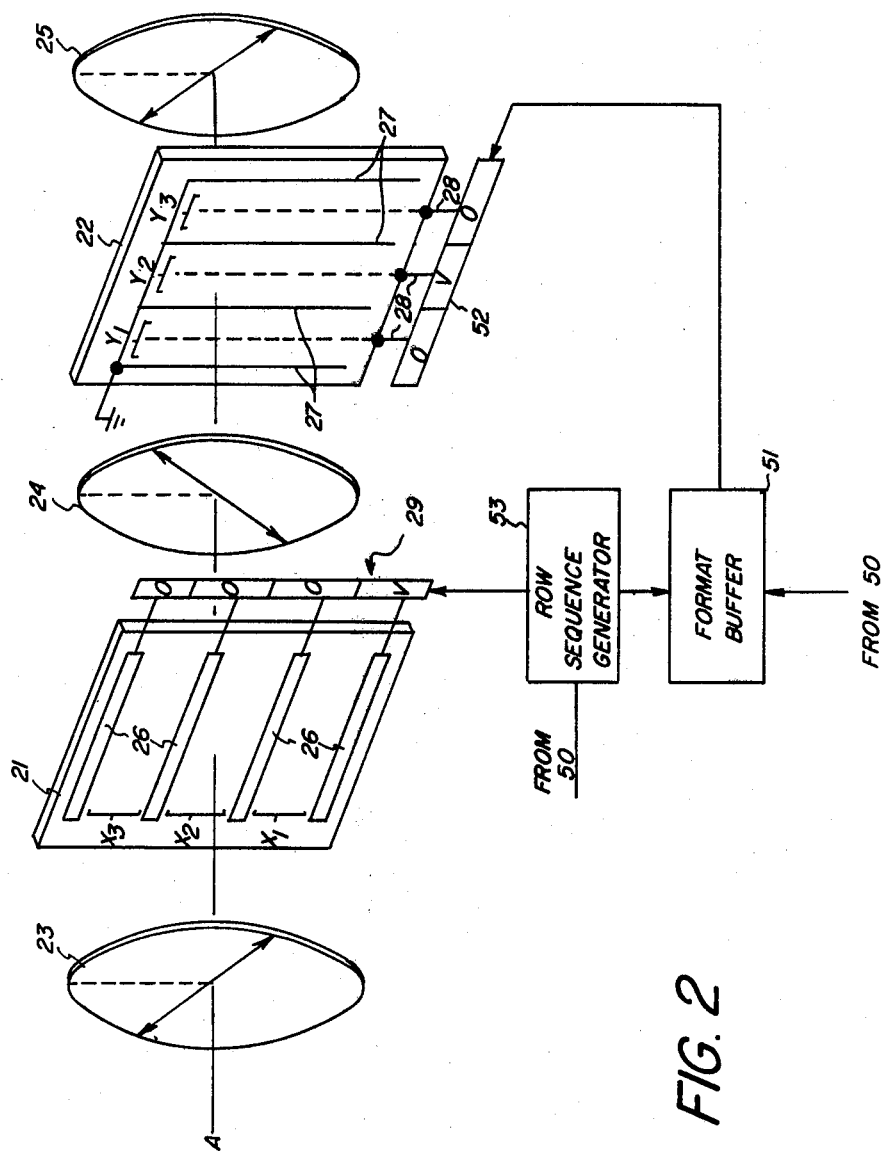
FIG. 2 is a schematic perspective of one preferred embodiment of area light valve array and address control structure for the FIG. 1 device and apparatus.

As shown in FIG. 2, the area modulators and polarizing means are arranged along an optical axis A in a predetermined sequence and orientation. Specifically, the first area modulator 21 is located between entrance polarizing means 23 and intermediate polarizing means 24 and the second area modulator 22 is located between polarizing means 24 and exit polarizing means 25. It is to be noted that the polarizing means each can comprise multiple sheet polarizers with aligned directions of polarization as indicated. In this regard, we have found a remarkable increase in contrast ratio is obtained when intermediate polarizing means 24 comprises two sheet polarizers aligned e.g. in the direction indicated in FIG. 2. Usually it will be desirable to dispose the elements in closely spaced relation; however, in certain embodiments other light directing optical elements can be interposed along the optical path. As indicated in FIG. 2, it is important that the polarization direction of the entrance and exit polarizing means 23 and 25 be the same and that the polarization direction of the intermediate polarizing means 24 be orthogonal to those of the other polarizing means.

As shown in FIG. 2, each of the area modulators 21 and 22 is divided into a plurality of independently addressable strip portions ($X_1-X_3$ and $Y_1-Y_3$) by strip electrodes extending across their major surfaces in predetermined configurations. Referring first to modulator 21, it can be seen that a plurality of linear electrodes 27 extend from a common line along the top of the modulator in a parallel spaced relation to the bottom of the modulator, and a plurality of addressing electrodes 28 extend in parallel spaced relation toward the top of the modulator, interleaved between electrodes 27. Other preferred electrode structures are disclosed in U.S. patent application Ser. No. 230,099, entitled "Light Valve Imaging Apparatus Having Improved Addressing Electrode Structure" and filed Jan. 29, 1981, in the names of J. M. Mir and J. R. Varner.

In one mode for address the electrodes 27 can be coupled to a common source of reference potential, e.g. ground and the electrodes 28 selectively energized to an activating potential level. One preferred mode for activating such electrodes to an optimized potential level is disclosed in copending U.S. patent application Ser. No. 230,095, entitled "Light Valve Imaging with Optimized Addressing Potentials to Reduce Inter-Pixel Nonuniformity" and filed Jan. 29, 1981, in the name of J. M. Mir, which is incorporated herein by reference. Thus zones ($Y_1-Y_3$) between adjacent pair of electrodes 27 form light-modulating strip portions across the "Y" direction of the area array 20.

The area modulator 21 has a slightly different electrode arrangement; however, it can also be formed like modulator 22 but with the strip portions in the "X" direction. Instead, in the illustrated embodiment, the modulator 21 comprises a plurality of separately-addressable linear electrodes 26 extending horizontally across the modulator and coupled to an addressing source 29 adjacent the modulator. To activate one of the light-modulating strip portions ($X_1-X_3$), it is necessary that the adjacent electrodes 26 defining that portion be at different potential levels to form the activating electrical field thereacross. This can be done in an electrically efficient fashion, which will be described subsequently, for the preferred embodiment disclosed.

However, first it should be noted that it is highly preferred according to the present invention that the fields applied across strip portions $X_1-X_3$ and $Y_1-Y_3$ be in a direction perpendicular to the optical axis A. Thus as used herein the phrase "transversely across" is used to distinguish this field direction in contrast to the direction across the thickness of the element (i.e., in a direction parallel to the optical axis A). The significance of this aspect is that this mode of field application results in light modulation in the transverse or Kerr mode rather than in the longitudinal or scattering mode. Although the longitudinal modulation mode may be useful for some applications, the high contrast ratios obtainable with the transverse mode make it highly preferable.

One preferred mode of operation of the above-described area light valve array 20 will now be explained as it cooperates with the other parts of the electronic printer embodiment shown schematically in FIG. 1. Thus, under the control of logic and control unit 50, format buffer 51 outputs the pixel information for a portion of a line of image formation, which it has received and stored from an image signal source (e.g. unit 50), to addressing source 52 (e.g., a shift register) for area modulator 22. During this same period row sequence generator 53 outputs a line signal to addressing source 29 (e.g., a shift register) for area modulator 21, also under the control of unit 50. Thereafter unit 50 initiates an address signal which causes the addressing sources 29 and 52 to energize electrodes $X_1$-$X_3$ and $Y_1$-$Y_3$ in accordance with the information clocked therein. At the same time unit 50 commands appropriate energization of illuminating means 12 to effect uniform illumination of modulator 21 through polarizing means 23 (with panchromatic or a particular color light depending on whether the application is black-and-white or color). U.S. Pat. No. 4,229,095 discloses means for providing a series of different color light pulses during a line exposure period and illumination control 57 in FIG. 1 can be constructed to effect such a function. Alternatively, the apparatus can effect sequential color separation page exposures in which instance illumination control 57 will maintain a given color for an entire page and then switch to a different color for re-imaging a photosensitive medium with that information. Of course in monochrome imaging illumination control 57 would not be required.

Now, assuming the address sources to be loaded with information as shown (i.e., "V"—energize the coupled electrode; "O"—do not energize the coupled electrode), the $Y_2$ pixel of row $X_1$ of the light valve array will transmit light and the $Y_1$ and $Y_3$ pixels of row $X_1$ will not. This can be explained as follows. In area modulator 21, only the electrodes defining row $X_1$ have a potential differential and thus an electrical field is present only transversely strip $X_1$. Polarized light directed onto the surface of modulator 21 thus passes through rows $X_2$-$X_3$ without modulation but such light passing through row $X_1$ is rotated 90° because that strip portion is now in its polar, birefringent state. Upon exiting modulator 21, the light from rows $X_2$-$X_3$ is blocked by crossed polarizing means 24, but the light exiting row $X_1$ (having been rotated 90°) passes polarizing means 24 and forms an illuminated strip (orthogonal to strips $Y_1$-$Y_3$) on modulator 22. By virtue of its addressed activation, strip $Y_2$ of modulator 22 is in the polar, birefringent state and rotate light passing therethrough 90°. Non-activated strips $Y_1$ and $Y_3$ do not rotate light falling thereon. Thus light passing activated strips passes polarizing means 25 (which is crossed relative to polarizing means 24) and light passing non-activated strips is blocked by polarizing means 25.

Referring in particular to FIG. 1, and assuming that light valve array 20 and its address control 16 have the form and operate as just described with respect to FIG. 2, an overall printing mode of operation can be described. Thus, during a given line exposure period (while a line of record medium M is at station 13), there occurs a plurality of multi-pixel, partial-line exposures. For example, in the FIG. 1 embodiment, the pixels $P'_1$-$P'_3$, are exposed in a first partial-line exposure, followed sequentially by $P'_4$-$P'_6$ and $P'_6$-$P'_9$ partial-line exposures. Such partial line exposures are effected by area-to-linear light valve device 11 which first imagewise modulates the light passage through $P_3$-$P_3$ sector of light valve array pixel portions (which are imaged by lens 30 onto mapping array elements $P''_1$-$P''_3$ and then directed to pixels $P'_1$-$P'_3$ of the linear exposure station) and then sequentially imagewise modulates light passing through the $P_4$-$P_6$ and $P_7$-$P_9$ sectors (which are similarly imaged to their respective pixels of the linear exposure station).

The above successive addressings of pixel portion sectors can be effected repeatedly for each different light color during given line period or the recording medium can be moved past the exposure station a plurality of times, once for each different color exposure. It will be appreciated that in either such mode, or in other variations, the cooperation of the area light valve array shown in FIG. 2 and the optical mapping means 40 provide a highly desirable solution to the problems outlined initially in this application.

Figure 4:
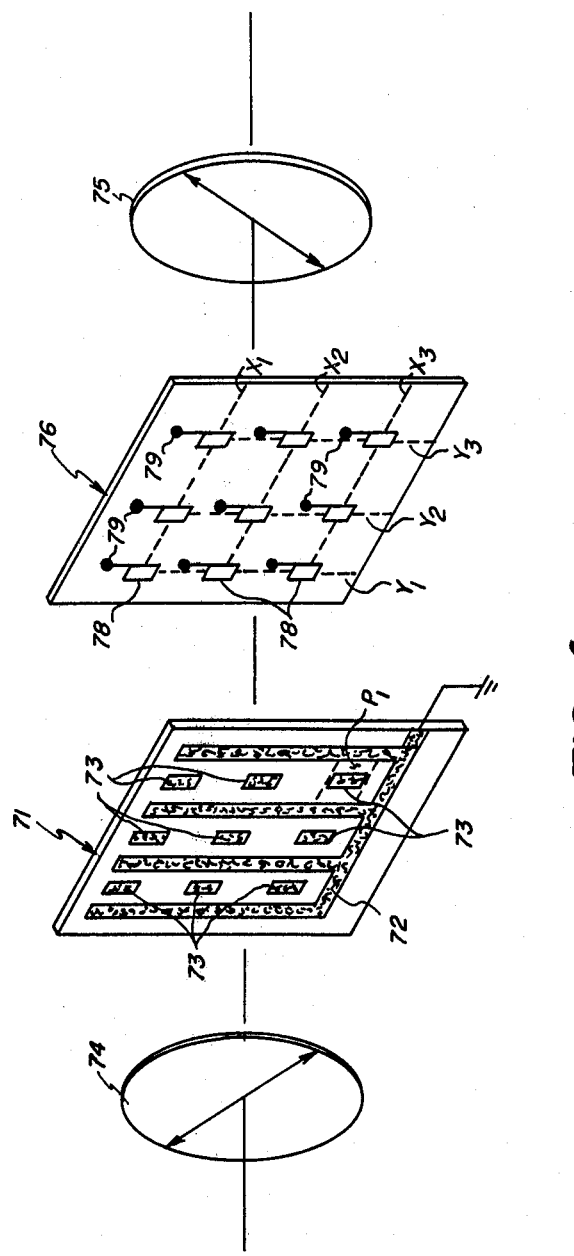
FIG. 4 is a schematic perspective of another preferred embodiment of area light valve array and address control structure for the FIG. 1 device and apparatus.

Now referring to FIG. 4, an alternative embodiment of light valve array and addressing means is illustrated. In this embodiment an electrooptic panel 71 having a ground electrode 72 and discrete activating electrodes 73 is disposed between crossed polarizers 74, 75 and addressed by thin film transistor (TFT) panel 76. More specifically, the panel 76 comprises discrete transistor circuits 78 electrically addressable by electrodes $X_1$-$X_3$ and $Y_1$-$Y_3$ to discretely energize respective pixel portions of panel 71 via "solder bumps" 79 which electrically couple respective TFT circuits and electrodes 73. For example, to activate pixel $P_1$ of panel 71, electrodes $X_3$ and $Y_3$ are selectively energized by logic and control unit 50. This provides energizing voltage to the activating electrode 73 for pixel portion $P_1$ through the solder bump 79 that is coupled to such activating electrode. The use of TFT array allows individual drive signals for each light valve and provides greater flexibility in designating the light valve electrode structure to match the needs of any given application. Contact can be made to the TFT array and electrooptic panel via well known solder bump technology with a single step heat-reflow process. The TFT embodiment offers compactness, ruggedness and low price typical of solid state devices.

The area-to-linear light valve device 11 has thus far been described as it is utilized in printer apparatus. How such a device can be used in scanner or scanner/printer apparatus can be understood by again referring to FIG. 1 and considering the following description. Thus, assume than an original transparency is moved past station 13 instead of recording medium M and that an array 90 (dotted lines in FIG. 1) of pixel photodetectors is located on the opposite side of the station 13 from illumination source 12 and light valve device 11. With address of the light valve as described with respect to either FIG. 2 or 3, but without the input of image information, each pixel $P'_1$-$P'_9$ of the exposure zone can be illuminated for detection by the respective photocell elements of array 90. Thus, if all pixel portions of array 20 are "on" during each line period, mapping means 40 directs light therefrom to respective pixels of the station 13 (in this mode a scan station). These light spots will be modulated by the image content of the original and sensor array 90 provides an image signal of successive lines to unit 50 where it can be stored or provided to a printer apparatus in proper format for operation as previously described. If the unit 50 stores the image signal, a sheet of recording medium can be subsequently fed past the same station 13 and in such embodiment FIG. 1 comprises scanner/printer apparatus advantageously using common elements.

The invention has been described in detail with particular reference to certain preferred embodiments thereof, but it will be understood that variations and modifications can be effected within the spirit and scope of the invention.

What is claimed is:

1. A light valve device adapted to control the passage of light selectively to discrete ones of a plurality of pixel zones respectively located along a linear pixel region, said device comprising:
   (a) an area light valve array having a plurality of discretely-addressable pixel portions distributed in a two-dimensional pattern;
   (b) lens means for imaging said two-dimensional pattern of pixel portions at an intermediate image plane; and
   (c) optical mapping means, located at said intermediate image plane, for re-imaging the incident two-dimensional pattern of pixel portions as a predetermined one-dimensional line pixel pattern at such linear pixel region.

2. The invention defined in claim 1 wherein said area light valve array comprises:
   (1) first and second light-modulating panels each including (i) a plurality of generally coplanar and parallel light valve strips, formed of an electro-optic material of the type that is transformable by an electric field from a non-polar, isotropic state to a polar, birefringent state, and (ii) addressable means for selectively applying discrete electric fields transversely across respective strips, said panels being generally parallel, with their respective strips opposing and in a generally orthogonal relation; and
   (2) first, second and third light-polarizing means in optical alignment with said panels, said first and third polarizing means being located respectively on opposite sides of said panels and oriented with their directions of polarization generally aligned, said second polarizing means being located between said panels and oriented with its direction of polarization generally orthogonal to those of said first and third light-polarizing means.

3. The invention defined in claim 1 wherein said area light valve array comprises:
   (1) a two-dimensional light-modulating panel formed of an electro-optic material of the type that is transformable by an electric field from a non-polar, isotropic state to a polar, birefringent state;
   (2) a thin film transistor array electrically coupled to said panel and constructed for selectively activating said two-dimensional pattern of discretely-addressable pixel portions; and
   (3) first and second light-polarizing means sandwiching said panel and said transistor array and oriented with their directions of polarization generally orthogonal.

4. The invention defined in claim 1, 2 or 3 wherein said optical mapping means comprises an array of holographic diffracting elements, each of elements being optically aligned with a respective pixel portion of said light valve array and adapted to image its respective pixel portion at a unique zone along such linear pixel region.

5. The invention defined in claim 1, 2 or 3 wherein said optical mapping means comprises an array of refractive elements, each of such elements being optically aligned with a respective pixel portion of said light valve array and adapted to image its respective pixel portion at a unique zone along such linear pixel region.

6. Electronic imaging apparatus of the kind adapted to expose, during respective line periods, successive lines of a recording medium moving past a linear exposure station including a plurality of pixel zones, said apparatus comprising:
   (a) an area light valve array having a plurality of discretely-addressable pixel portions distributed in a two-dimensional pattern;
   (b) means for uniformly illuminating said area array with light directed generally toward said exposure station;
   (c) lens means for imaging said two-dimensional pattern of pixel portions at an intermediate image plane;
   (d) optical mapping means, located in said intermediate image plane, for re-imaging the incident two-dimensional pattern of pixel portions as a predetermined one-dimensional line pixel pattern at such linear pixel region; and
   (e) means for addressing each of said pixel portions of said light valve array during each line period in accordance with image information corresponding to its portion of the image line being exposed during that line period.

7. The invention defined in claim 6 wherein said area light valve array comprises:
   (1) first and second light-modulating panels each including (i) a plurality of generally coplanar and parallel light valve strips, formed of an electro-optic material of the type that is transformable by an electric field from a non-polar, isotropic state to a polar, birefringent state, and (ii) addressable means for selectively applying discrete electric fields transversely across respective strips, said panels being generally parallel, with their respective strips opposing and in a generally orthogonal relation; and
   (2) first, second and third light-polarizing means in optical alignment with said panels, said first and third polarizing means being located respectively on opposite sides of said panels and oriented with their directions of polarization generally aligned, said second polarizing means being located between said panels and oriented with its direction of polarization generally orthogonal to those of said first and third light-polarizing means.

8. The invention defined in claim 6 wherein said area light valve array comprises:
   (1) a two-dimensional light-modulating panel formed of an electro-optic material of the type that is transformable by an electric field from a non-polar, isotropic state to a polar, birefringent state;
   (2) a thin film transistor array electrically coupled to said panel and constructed for selectively activating said two-dimensional pattern of discretely-addressable pixel portions; and
   (3) first and second light-polarizing means sandwiching said panel and said transistor array and oriented with their directions of polarization generally orthogonal.

9. The invention defined in claim 6, 7 or 8 wherein said optical mapping means comprises an array of holographic diffracting elements, each of elements being optically aligned with a respective pixel portion of said light valve array and adapted to image its respective pixel portion at a unique zone along such linear pixel region.

10. The invention defined in claim 6, 7 or 8 wherein said optical mapping means comprises an array of refractive elements, each of such elements being optically aligned with a respective pixel portion of said light valve array and adapted to image its respective pixel portion at a unique zone along such linear pixel region.

11. Electronic imaging apparatus of the kind adapted to expose, during respective line periods, successive lines of a recording medium moving past a linar exposure station, which includes a plurality of pixel zones, said apparatus comprising:
(a) first and second light-valve, area arrays, each array comprising a plurality of parallel strip portions which are activatable between birefringent and isotropic states in response to application and removal of an electric field, said area arrays being aligned along an optical axis in an optically opposed relation with their respective said strip portions generally orthogonal optically so as to cooperatively define a plurality of pixel portions in a two-dimensional pattern;
(b) addressable activating means for selectively applying discrete electrical fields transversely across respective strip portions;
(c) first, second and third light polarizing means aligned along said optical axis so that said first array is optically between said first and second polarizing means and said second array is optically between said second and third polarizing means, said first and third polarizing means being oriented with their directions of polarization generally aligned and parallel to the plane of said arrays and said second polarizing means being optically oriented with its direction of polarization generally parallel to the plane of said arrays and orthogonal to those of said first and third polarizing means;
(d) means for illuminating said first array along said optical axis and through said first polarizing means;
(e) lens means for imaging said two-dimensional pattern of pixel portions at an intermediate image plane;
(f) optical mapping means, located in said image plane, for re-imaging the incident two-dimensional pattern as a line pattern along said linear exposure station; and
(g) addressing means coupled to said activating means for:
(1) sequentially applying an electrical field to successive strip portions of one of said arrays; and
(2) concurrently applying electrical fields to the strip portions of the other of said arrays in timed relation with the sequential activations of said one array and in accordance with an electrical signal containing a line of image information.

12. The invention defined in claim 11 wherein said illuminating means includes color-control means for producing a plurality of different color periods during each of which light of a different color illuminates said first array.

13. The invention defined in claim 12 wherein said color-control means and said addressing means are synchronized so that a plurality of said sequential and said concurrent field applications occur during each color period to effect color separation line exposures.

14. Electronic color imaging apparatus of the kind adapted to expose, during respective line periods, successive lines of a color recording medium moving past a linear exposure station, which includes a plurality of pixel portions, said apparatus comprising:
(a) first and second light-valve, area arrays, each array comprising a plurality of parallel strip portions which are activatable between birefringent and isotropic states in response to application and removal of an electric field, said area arrays being aligned along an optical axis in an optically opposed relation with their respective said strip portions generally orthogonal optically so as to define cooperatively a plurality of pixel portions having a two-dimensional pattern;
(b) first and second addressable activating means respectively for selectively applying discrete electrical fields transversely across respective strip portions of said first and second arrays;
(c) first, second and third light polarizing means aligned along said optical axis so that said first array is optically between said first and second polarizing means and said second array is optically between said second and third polarizing means, said first and third polarizing means being optically oriented with their directions of polarization generally aligned and parallel to the plane of said arrays and said second polarizing means being optically oriented with its direction of polarization generally parallel to the plane of said arrays and orthogonal to those of said first and third polarizing means;
(d) means for producing a plurality of light illumination periods, each of a different color, wherein such light is directed along said optical axis so as to illuminate said arrays;
(e) lens means for imaging said two-dimensional pixel pattern at an intermediate image plane;
(f) optical mapping means, located in said image plane, for re-imaging the incident two-dimensional pixel pattern along said linear exposure station;
(g) first addressing means coupled to first activating means for applying an electrical field across individual strip portions of said first array in a predetermined sequential order; and
(h) second addressing means for applying electrical fields to the strip portions of said second array in timed relation with the sequential activations of said one array and in accordance with electrical signals respectively containing sub-portions of a line of image information.

15. A scanning device adapted to selectively illuminate discrete ones of a plurality of pixel zones respectively located along a linear pixel region, said device comprising:
(a) an area illuminating array having a plurality of discretely-addressable pixel portions distributed in a two-dimensional pattern;
(b) lens means for imaging said two-dimensional pattern of pixel portions at an intermediate image plane; and
(c) optical mapping means, located in intermediate image plane, for re-imaging the incident two-dimensional pattern of pixel portions as a predetermined one-dimensional line pixel pattern at such linear pixel region.

16. The invention defined in claim 15 wherein said optical mapping means comprises an array of holographic diffracting elements, each of elements being optically aligned with a respective pixel portion of said illuminating array and adapted to image its respective pixel portion at a unique zone along such linear pixel region.

17. The invention defined in claim 15 wherein said optical mapping means comprises an array of refractive elements, each of such elements being optically aligned with a respective pixel portion of said illuminating array and adapted to image its respective pixel portion at a unique zone along such linear pixel region.

* * * * *